(12) United States Patent
Brannock

(10) Patent No.: US 7,103,641 B2
(45) Date of Patent: Sep. 5, 2006

(54) METHOD AND APPARATUS FOR DISTRIBUTING COMPUTER PLATFORM FIRMWARE ACROSS A NETWORK

(75) Inventor: Kirk D. Brannock, Olympia, WA (US)

(73) Assignee: Intel Corporation, Santa Clara, CA (US)

(*) Notice: Subject to any disclaimer, the term of this patent is extended or adjusted under 35 U.S.C. 154(b) by 721 days.

(21) Appl. No.: 09/884,289

(22) Filed: Jun. 18, 2001

(65) Prior Publication Data

US 2002/0194313 A1 Dec. 19, 2002

(51) Int. Cl.
G06F 15/16 (2006.01)

(52) U.S. Cl. .............. 709/217; 709/216; 709/219; 709/221; 709/203; 713/2; 713/100; 714/36

(58) Field of Classification Search .......... 709/203, 709/216–222; 713/1, 2, 100; 717/171–173, 717/175, 176; 714/36
See application file for complete search history.

(56) References Cited

U.S. PATENT DOCUMENTS

| 5,230,052 | A * | 7/1993 | Dayan et al. ............ 713/2 |
| 5,410,699 | A * | 4/1995 | Bealkowski et al. ...... 713/2 |
| 5,805,882 | A * | 9/1998 | Cooper et al. ........... 713/2 |
| 5,835,761 | A * | 11/1998 | Ishii et al. ............. 713/2 |
| 5,919,257 | A * | 7/1999 | Trostle ................. 726/22 |
| 5,964,873 | A * | 10/1999 | Choi .................... 713/2 |
| 6,026,016 | A * | 2/2000 | Gafken ............... 365/185.4 |
| 6,052,803 | A * | 4/2000 | Bhatia et al. ........... 714/49 |
| 6,175,919 | B1 * | 1/2001 | Ha .................... 709/217 |
| 6,266,809 | B1 * | 7/2001 | Craig et al. ........... 717/173 |
| 6,275,931 | B1 * | 8/2001 | Narayanaswamy et al. .. 713/2 |
| 6,438,688 | B1 * | 8/2002 | Nunn ................. 709/220 |
| 6,477,648 | B1 * | 11/2002 | Schell et al. ........... 726/3 |
| 6,484,262 | B1 * | 11/2002 | Herzi ................. 709/222 |
| 6,594,757 | B1 * | 7/2003 | Martinez .............. 709/221 |
| 6,622,246 | B1 * | 9/2003 | Biondi ................ 713/100 |
| 6,640,334 | B1 * | 10/2003 | Rasmussen ............ 717/171 |
| 6,718,464 | B1 * | 4/2004 | Cromer et al. .......... 709/222 |
| 6,732,267 | B1 * | 5/2004 | Wu et al. .............. 713/2 |
| 6,775,728 | B1 * | 8/2004 | Zimmer et al. .......... 713/2 |
| 6,848,046 | B1 * | 1/2005 | Zimmer ............... 713/100 |
| 7,003,659 | B1 * | 2/2006 | Rich et al. ............. 713/2 |
| 2003/0066062 | A1 * | 4/2003 | Brannock et al. ........ 717/169 |

* cited by examiner

*Primary Examiner*—Ario Etienne
*Assistant Examiner*—Ramy M. Osman
(74) *Attorney, Agent, or Firm*—Blakely, Sokoloff, Taylor & Zafman LLP

(57) ABSTRACT

A method and system for storing and accessing firmware that is distributed across both local and remote storage devices. This capability is facilitated by a standard software abstraction for a firmware storage device, known as a Firmware Volume (FV), which enables platform firmware to be stored in a variety of types of devices, including remote storage devices that may be access via a network. Under this distributed firmware storage architecture, platform firmware code may be written in a manner such that only the early memory initiation code and code necessary to produce or access to an FV exists in the local system ROM. All other firmware components, including device initialization and OS bootstrap code, may be located remotely. As a result, the firmware code, such as a system's BIOS, may be updated by simply updating the portion of the firmware that is stored in the firmware volume.

20 Claims, 7 Drawing Sheets

METHOD AND APPARATUS FOR DISTRIBUTING COMPUTER PLATFORM FIRMWARE ACROSS A NETWORK

BACKGROUND OF THE INVENTION

1. Field of the Invention

The present invention concerns computer systems in general, and the distributing and loading of platform firmware in particular.

2. Background Information

Computer platform firmware is used during initialization of computer systems to verify system integrity and configuration. It also generally provides the basic low-level interface between hardware and software components of those computer systems, enabling specific hardware functions to be implemented via execution of higher-level software instructions contained in computer programs that run on the computer systems. In computers, a primary portion of this firmware is known as the Basic Input/Output System (BIOS) code of a computer system. The BIOS code comprises a set of permanently recorded (or semi-permanently recorded in the case of systems that use flash BIOS) software routines that provides the system with its fundamental operational characteristics, including instructions telling the computer how to test itself when it is turned on, and how to determine the configurations for various of built-in components and add-on peripherals.

In a typical PC architecture, the BIOS is generally defined as the firmware that runs between the processor reset and the first instruction of the Operating System (OS) loader. As shown in FIG. 1, in a typical PC 10, the base portion of the BIOS code is stored in some type of ROM (read only memory) device on the PC's motherboard 12, such as a standard PROM 14 or a flash EPROM 16. In some configurations, this base portion may be extended using code stored in ROM BIOS chips 18 contained on one or more add-on peripheral cards 20, such as SCSI controllers and bus-mastering devices. This portion of the BIOS is stored in components that are commonly referred to as "option ROMs." The BIOS code in peripheral card ROM BIOS chips 18 typically concerns specific functionality provided by their corresponding peripheral card and is executed during initialization of that peripheral card according to a well-defined (mostly) set of rules. In either of the foregoing configurations, all BIOS firmware is stored locally, either on the motherboard or in option ROMs on the peripheral card(s) added to a system.

In many instances, the basic functionality of a computer system platform is defined by the platform's firmware. Accordingly, in order to enhance this functionality, corresponding code needs to be added to or modified in the firmware. In today's PC's, this may be accomplished by either replacing the BIOS chip(s) on the motherboard (and/or peripheral cards), or, if those BIOS code is contained in rewritable chips (e.g., flash EPROM chips), executing a BIOS update software program that rewrites the BIOS code. Both of these methods requires user actions that may be prone to error, including improperly installing the new BIOS chips and inadvertently damaging the BIOS code by updating it with the wrong code or having a power failure or system crash in the middle of the code-update process.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

In the following description, numerous specific details are provided to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Conventional BIOS Operation

Figure 1:
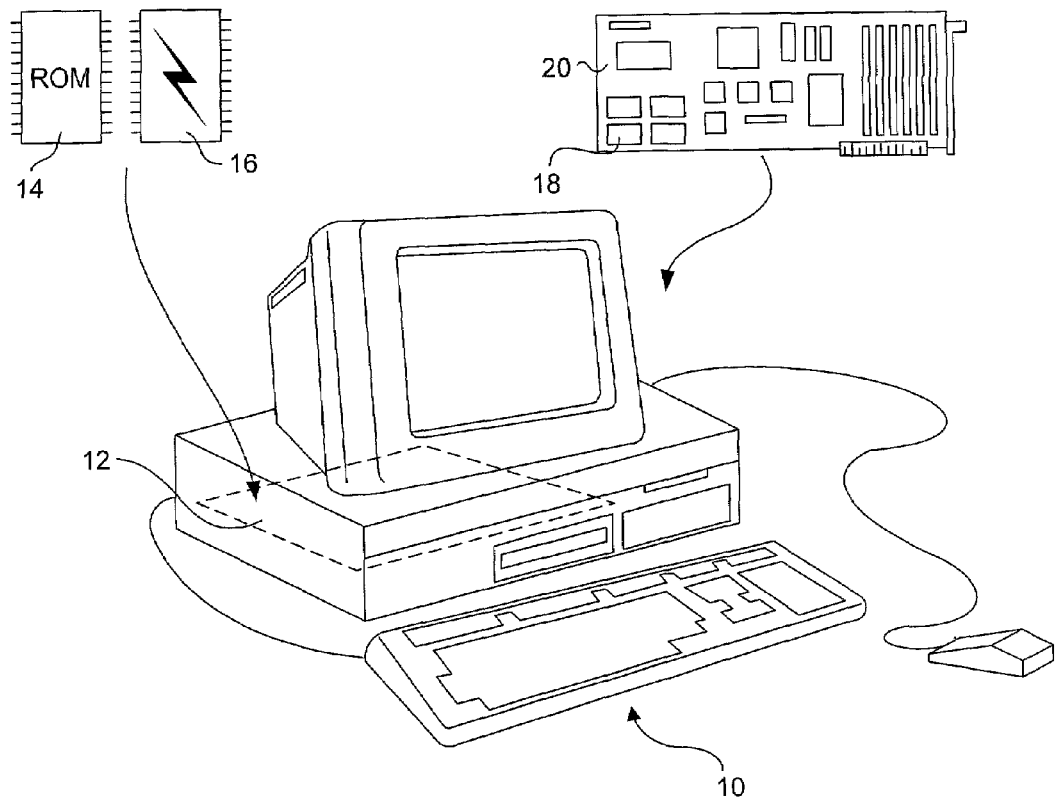
FIG. 1 is a schematic diagram illustrating how BIOS firmware is loaded in a conventional personal computer.

In a conventional computer system, the BIOS starts to work as soon as a system is turned on. For example, when modern Intel microprocessors (e.g., Pentium III, IV) start to work, they immediately set themselves up in real mode and look at a special memory location that holds a jump instruction that redirects the processor to begin execution of code at another address corresponding to where the base portion of the BIOS is actually stored, such as ROM chip 12 in FIG. 1.

Figure 2:
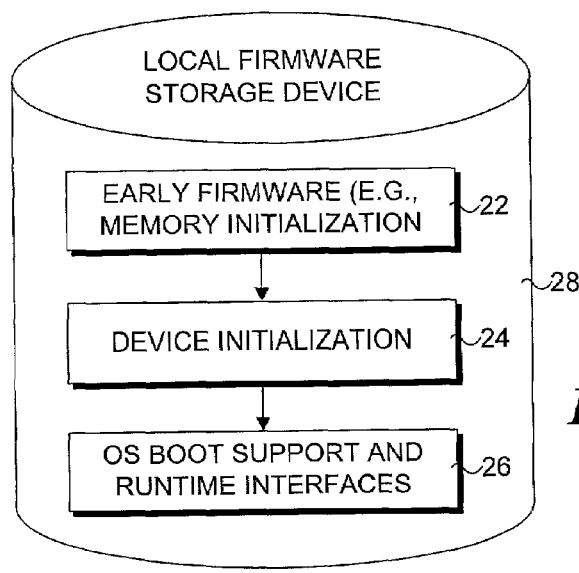
FIG. 2 is a block diagram illustrating the major functions performed during conventional execution of the BIOS firmware.

Execution of the first portion of BIOS code performs a series of diagnostic routines, called the Power-On Self Test (POST) routine, which ensures the major hardware components in a computer system are functioning properly. As depicted by a block 22 in FIG. 2, during a first (i.e., early firmware) phase of the POST routine the BIOS enumerates and initializes the system memory and performs other critical chipset initialization. One by one, the POST routine checks the integrity of the motherboard, processor, and memory, and checks for the existence of various devices, including a mouse, a keyboard, various storage devices (e.g., floppy drive, hard drives, CD ROM drives, tape drives, etc.), and other components corresponding to configuration information stored in the computer's CMOS memory, or similar persistent storage. As depicted by a second phase block 24, after the BIOS makes sure that the system is operating properly, it enumerates all non-memory devices on all busses in the system and initializes and starts these devices, as appropriate. In a third phase 26, the BIOS provides means for initiating the loading of the OS and produces runtime interfaces.

Distributed Platform Firmware Storage Architecture

As discussed above, in conventional personal computers, all of the BIOS code is stored in ROM-type devices local to the computer, either entirely on the motherboard, or via ROM devices on the motherboard and option ROMs on one or more peripheral add-on cards. Such local storage devices are depicted as a local firmware storage device having a root reference numeral 28 in the Figures attached hereto. It will be understood that local firmware storage devices 28 represents any device local to a computer system (i.e., contained within the computer's chassis or in close proximity thereto) in which BIOS firmware code is stored. These devices include motherboard and peripheral card option ROMS, as well any other device suitable for storing BIOS code, such as a hard disk drive.

In contrast to the conventional scheme of using localized storage devices for storing all of a computer system's BIOS code, the present invention provides a mechanism for enabling a substantial portion of such platform firmware to be stored and made accessible to a variety of "remote" resources in addition to the local ROM devices. This capability is facilitated by a standard software abstraction for a firmware storage device, known as a Firmware Volume (FV). Since the firmware storage abstraction is not tied to any specific type of hardware, it can be used to produce firmware components to the BIOS from almost any type of firmware device. For example, in a given system, one FV may represent a FLASH ROM part, while another may represent a disk partition, while yet a third may represent a remote directory on a server.

In accordance with this distributed platform firmware storage architecture, BIOS code may be written in a manner such that only the early memory initiation code and code necessary to produce or access to an FV exists in the local system ROM. All other firmware components, including device initialization and OS bootstrap code, may be located remotely. As a result, the BIOS code may be updated by simply updating the remote portion of the firmware. For instance, if the remote portion of the BIOS code is stored on a network firmware server, changing such code on the firmware server will effectively change the platform firmware for all computers that are configured to access a portion of their BIOS code from the firmware server.

Figure 3:
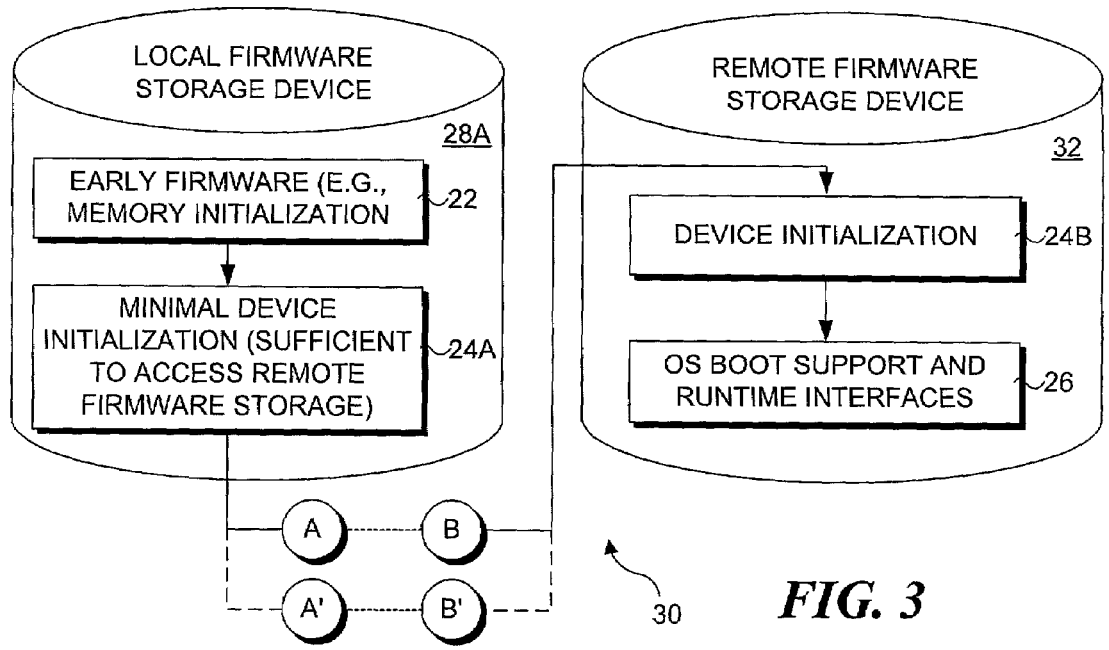
FIG. 3 is a block diagram/flowchart illustrating the distributed firmware storage and load architecture of the present invention.

An exemplary distributed platform firmware storage architecture 30 that stores a base portion of BIOS code in a local firmware storage device 28A and other portions of BIOS code in a remote firmware storage device 32 is illustrated in FIG. 3. In general, remote firmware storage device 32 will comprise a single storage device or network resource. However, it may comprise multiple storage devices or network resources as well.

The loading and execution of BIOS code in accordance with distributed platform firmware storage architecture 30 proceeds as follows. In a block 22A, the localized portion of the BIOS performs early firmware functions, including enumerating and initializing the system memory and other critical chipset initializations. These early firmware functions are carried out in substantially the same manner as discussed above with reference to block 22 of FIG. 2.

Figure 4:
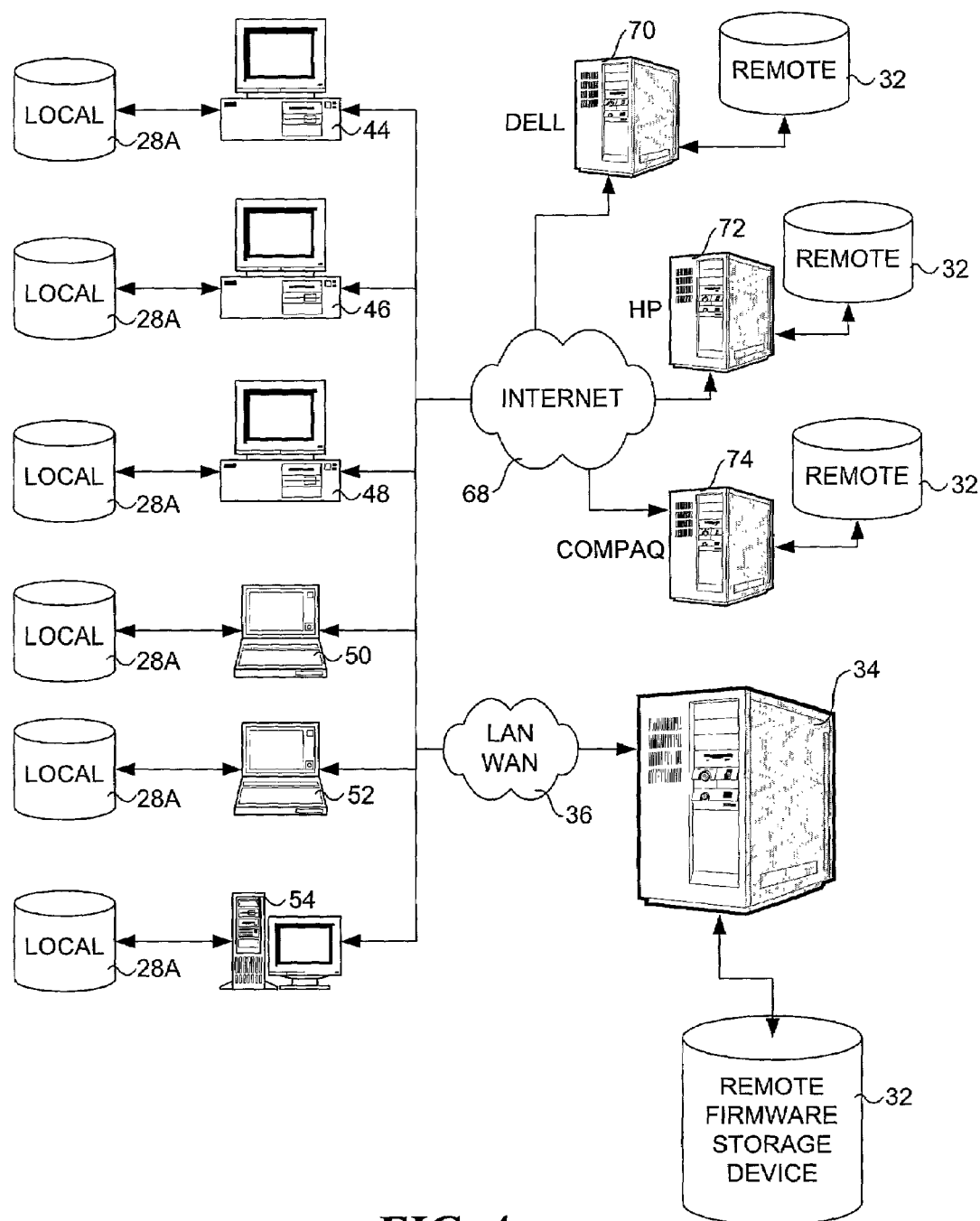
FIG. 4 is a schematic block diagram illustrating an exemplary architecture for storing computer platform firmware in a distributed manner in accord with the present invention.
Figure 5:
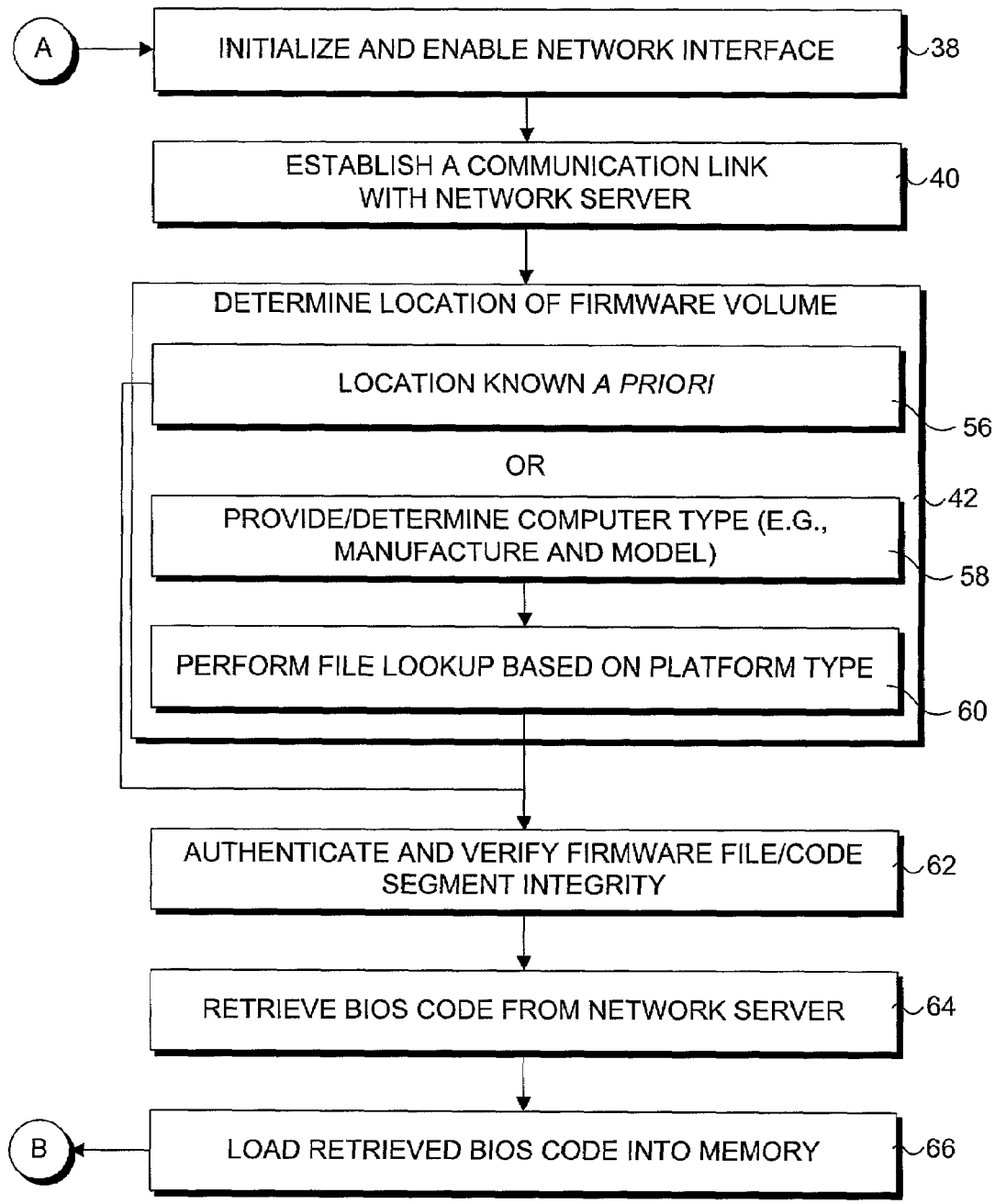
FIG. 5 is a flowchart illustrating the process of loading and executing the BIOS firmware in a conventional personal computer.

At this point, the distributed platform firmware architecture of the present invention deviates significantly from the conventional scheme. Rather than perform the complete device initialization functions of block 24, only a minimal set of device initialization functions are performed at this time. More specifically, those minimized set of device initialization functions merely need to enable the computer system to access platform firmware stored on remote firmware storage device 32. For example, as shown in FIG. 4, remote firmware storage device 32 may comprise a storage device (e.g., hard disk partition) that is accessible via a network firmware server 34, which is connected to the computer via a local area network (LAN) or a wide area network (WAN) 36. In this instance, block 24A performs the following functions. In a block 38, a network interface is initialized and enabled. This typically may comprise initializing and enabling a network interface card, or equivalent network interface circuitry built into the computer's motherboard. Next, in a block 40 a communication link with the network firmware server is established. Typically, in order to connect to a network server on a LAN or WAN either the IP address of the server of other unique identifier, such as the server's name on a LAN, need to be known. This information may be stored in a persistent or semi-persistent form via on-board memory component, such as the system's CMOS memory chip. Upon extracting the IP address or other network identification, a communication link with the network firmware server may be easily established.

Next, in a block 42, the location of the firmware volume on the network firmware server is determined. In most enterprise environments, there will be several different types of computers, such as depicted by desktop computers 44, 46 and 48, laptop computers 50 and 52, and mini tower computer/workstation 54. There may also be different configurations for each of the different types of computers. For instance, even if all of the desktop computers are from the same manufacturer, some of them might be different enough from the others that they will require a different set of platform firmware than the others. Accordingly, there needs to be a mechanism for ensuring the proper firmware is retrieved.

In an optional embodiment, the identity and/or location of a firmware file that contains remotely-stored firmware code that is to be used by a given computer system is known a priori (i.e., known by that system in advance), as provided by a block 56. In another embodiment, computer identity/platform type information is passed to the network firmware server, as provided by a block 54. For example, information corresponding to the manufacturer and model number of the computer may be passed to network server 32. Optionally, this information may be obtained from network configuration information previously stored on network firmware server 32. In this instance, the computer is identified by its network address (which is part of the header for every message sent using a typical network protocol, such as TCP/IP), and the proper platform firmware for that computer can then be retrieved from a table that maps network addresses to computer configuration data that is maintained on or made accessible to network firmware server 32. Once the platform type information for the computer system is known, the location of the firmware volume can be determined via a lookup table or via a file naming construct, as provided by a block 60

Next, in a block 62, the firmware code that is to be uploaded to the computer system is authenticated and its integrity is verified. In one embodiment, the firmware volume comprises a firmware file system (FSS) that includes one or more firmware files, each containing one or more segments. Each segment contains a set of firmware code that is suitable for one or more particular computer systems. Various mechanisms can be employed to ensure the authenticity of each firmware file, as well as the integrity of the file. For example, a digital signature may be encoded into a header for the firmware file or segment, whereby it can be checked against a digital signature known to the computer system. If the digital signatures do not match, the firmware code is no valid to upload.

Examples of integrity checks include file state checks and checksum operations. As an example of a file state check, each file may contain embedded integrity information, such that if a failure occurs during a file alteration (i.e., create, update, or delete) operation or due to a storage device failure, the file is flagged to indicate that it is invalid. This may be implemented by including state bits in the file's header, whereby one or more state bits are set during one of the foregoing file alteration operations, and cleared after the operation completes. If the file is found to have appropriate state bits set, it is known that the create, update, or delete operation was not completed successfully, and that the file is invalid. A checksum operation may be performed on the file as a whole, or various portions of the file. For instance, a checksum value may be used to verify the integrity of a file's header and/or main body. Checksum operations are well-known in the art; accordingly further details for performing such are not disclosed herein.

Once the location of the specific platform firmware code that needs to be loaded is known and the code is authenticated, platform firmware code corresponding to the computer is retrieved from network firmware server 32 and passed to the computer in a block 64. The BIOS is then loaded into memory for subsequent execution in a block 66.

Figure 6:
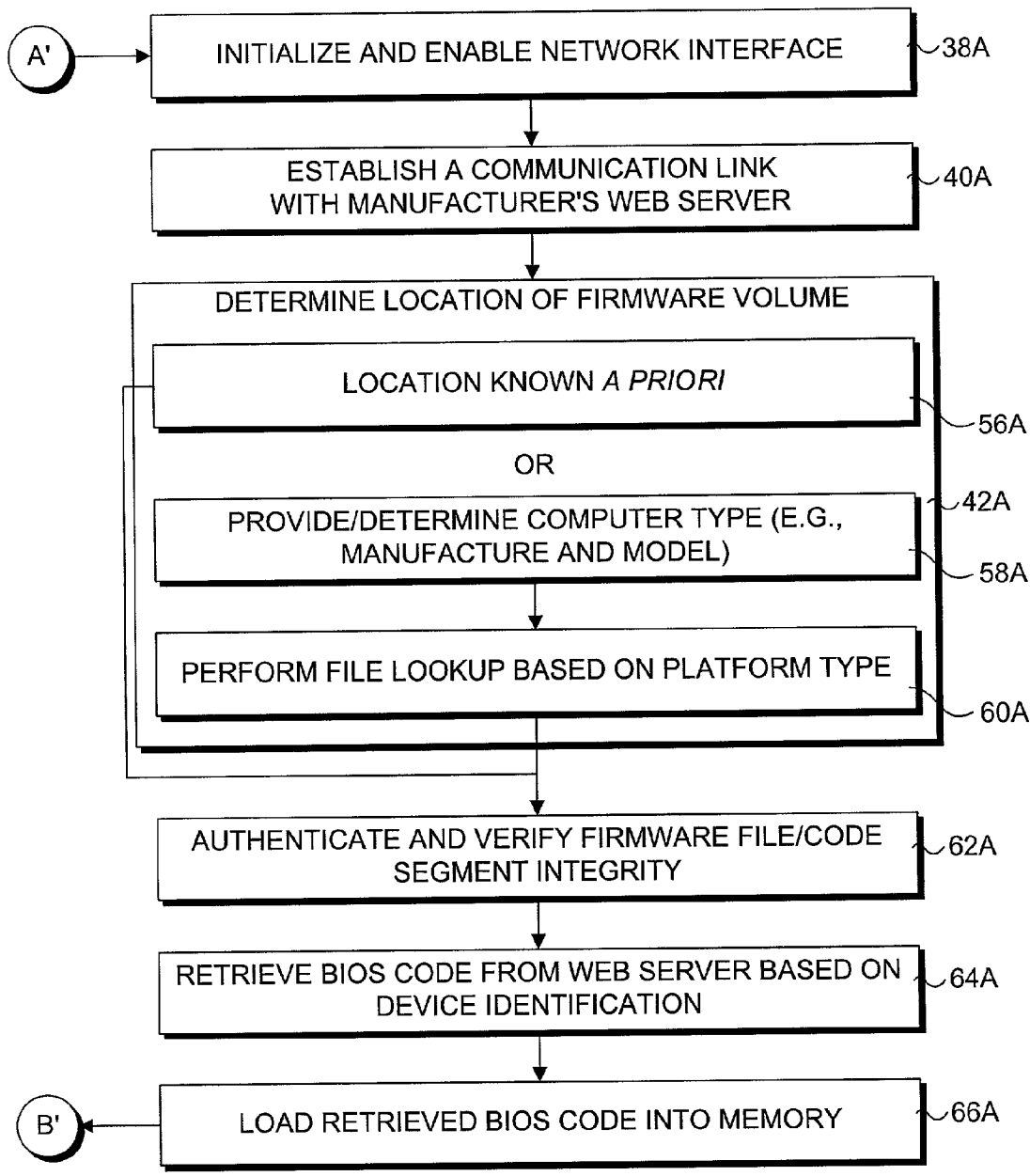
FIG. 6 is a flowchart illustrating the process of loading and executing platform firmware in accord with the distributed firmware storage architecture of the invention.

In another embodiment, the remote portion of the platform firmware may be stored on a web server operated by a manufacturer of the computer system that is accessed via the Internet 68, as depicted by a Dell server 70, a Hewlett-Packard (HP) server 72, and a Compaq server 74. For instance, under this configuration, the process of executing and loading the platform firmware for a Dell computer might proceed as follows. With reference to FIG. 6, as in the prior configuration, a network interface would be initialized and enabled in a block 38A, in a manner similar to that described above for block 38. Next, in a block 40A, a communication link is established with a web server operated by the manufacturer of the computer (in this case Dell server 70). Generally, in order to connect to the web server, network connection information will need to be known, such as a network IP address or a network URL (Uniform Resource Locator) for the server, or the name of an FTP server or NFS server. Alternately, if a DHCP (Dynamic Host Configuration Protocol) connection is used, the network may allow dynamically-configured connections that do not require the computer to know the IP address or server URL. Since network URL's are the primary means of establishing connections to web servers (vs. static IP addresses, which also may be used), the network URL for a manufacturer's platform firmware loading page hosted by the web server could be stored in the local base portion (i.e., early portion) of the BIOS itself, or could be stored in some other form of non-volatile memory, such as the system CMOS. An advantage of storing the information in the system CMOS is that it would enable the user to change the URL, if necessary. Of course, a user could also inadvertently change a proper URL to an incorrect URL, which would prevent the remote portion of the platform firmware from being loaded.

Next, in a block 42A, a determination of the location of the firmware volume is performed. As before, this information may be known a priori, as indicated by a block 56A, or platform type identification information may be provided in a block 58A to the web server so that the web server can determine what platform firmware the computer needs. As before, the computer might pass model number information (in this embodiment the manufacturer information would be implied). Optionally, if the computer uses a Pentium III or Pentium IV processor, as well as with some other types of processors, the computer could pass its processor identification information to the server. The processor identification information typically comprises a unique alphanumerical identifier (e.g., a 15 digit number), which can be used to uniquely identify the processor. Once this information is passed to the web site, the model number or processor identification information could by used as a search criteria to identify the proper platform firmware for the computer via a file lookup table performed in a block 60A.

Once the proper platform firmware has been determined and located, it is authenticated and verified for integrity in a block 62A, and retrieved from remote firmware storage device 32 and sent to the computer in a block 64A, whereupon it is loaded into memory in a block 66A.

Returning to FIG. 3, once the remote portion of the platform firmware has been retrieved and loaded into memory, the computer's processor begins execution of this portion of the firmware to perform the remaining functions that are generally performed during the loading and execution of a platform's firmware, including device initialization functions in a block 24B, and OS boot support and the generation of runtime interfaces in a block 26, in a manner similar to that discussed above.

Variations of the foregoing distributed platform firmware architecture may also be implemented. For example, it may be desirable to have all of the base portion of the platform firmware stored in flash ROM on the system's motherboard, wherein the distributed platform firmware scheme is used to automatically update this platform firmware on a periodic basis. In this instance, the computer could be programmed to automatically retrieve all or a portion of its platform firmware from a remote firmware server at the start of each month, or on a periodic basis (e.g., every 30 days, 90 days), and update the firmware stored in the flash ROM components. Data corresponding to the update dates and/or periodic time period could be stored as part of the firmware code, or may be stored in the computer's CMOS memory. In another embodiment, the platform firmware could be stored in flash ROM, and a BIOS date code could be passed to the network firmware server during execution of the BIOS code, whereby the BIOS code would be automatically updated if the BIOS date code for the platform firmware stored on the network firmware server was newer than the BIOS date code of the platform firmware presently stored in flash ROM on the computer. If the BIOS date codes match, the network firmware server could simply send back data indicating there is no need to update the firmware, and the remaining portion of the firmware stored in flash ROM could be executed to complete loading the firmware into the computer system. Preferably, each of these schemes should be designed such that if a connection to the network firmware server cannot be established, the remaining portion of the platform firmware code is automatically executed, thereby enabling the computer to boot up properly in the event that the network firmware server is not available.

Access to Firmware Volumes via Abstracted Interface

A significant aspect of the invention is its ability to provide firmware consumers access to firmware volumes that are both local and remote. This is enabled through use of a softare abstraction interface known as a firmware volume protocol instance. The firmware volume protocol instance is published by a corresponding firmware volume driver that is loaded during execution of the early firmware phase.

As a starting point, any firmware code that is accessed by a system is stored in some sort of firmware device. A firmware device is a persistent physical repository containing firmware code and/or data. Local firmware devices typically comprise a PROM or a FLASH component, but other types of persistent storage devices may also be used, such as a local hard disk. A single physical firmware device may be divided into smaller pieces to form multiple logical firmware devices. Similarly, multiple physical firmware devices may be aggregated into one larger logical firmware device. A logical firmware device is called a firmware volume. In EFI 2.0, the basic storage repository for data and/or code is the firmware volume. In general, each firmware volume is organized into a file system. In one embodiment, this file system is called a firmware file system (FFS). Other file systems could also be used. As such, the file is the base unit of storage for EFI 2.0 firmware.

Figure 7:
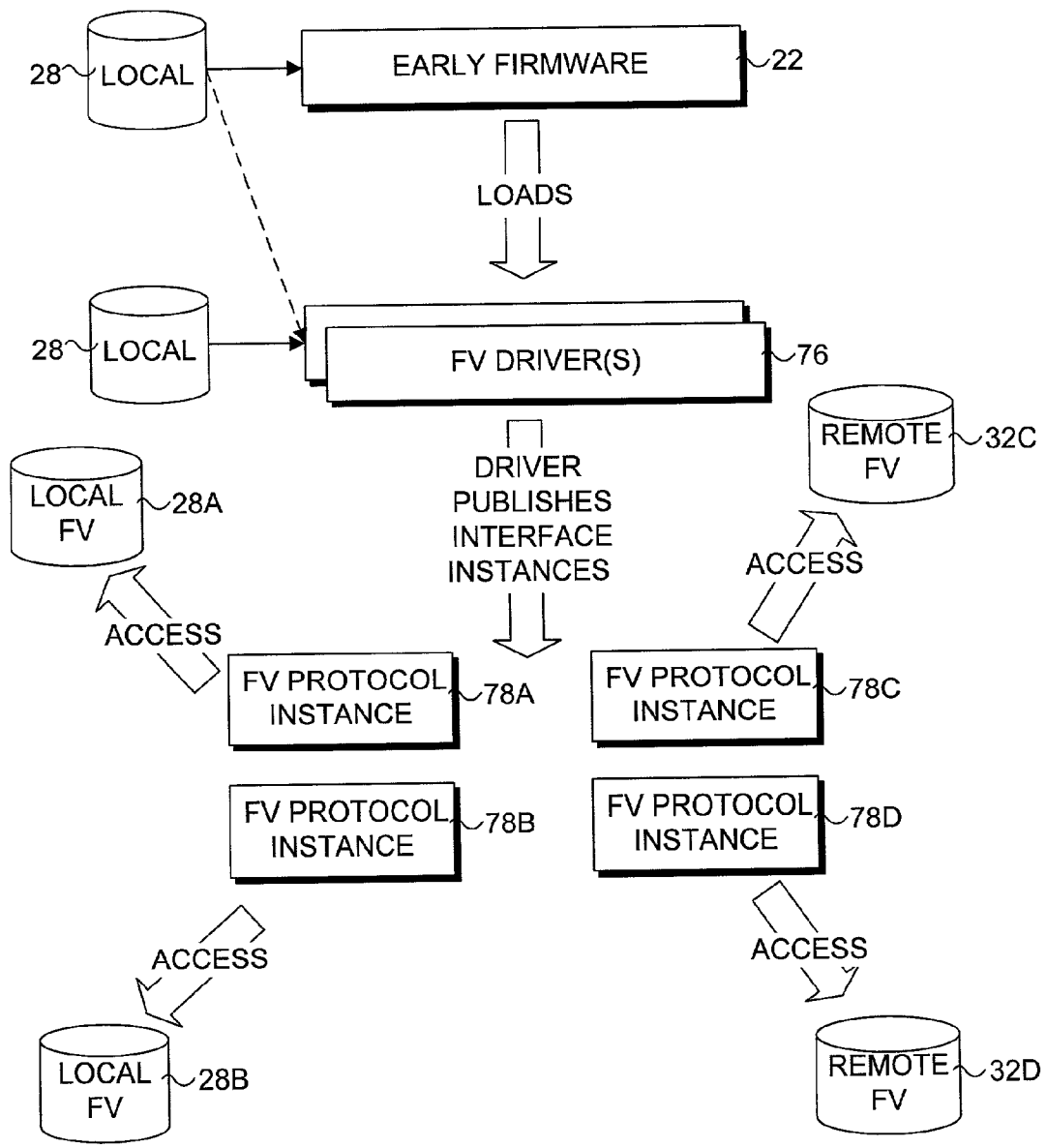
FIG. 7 is a schematic diagram of a personal computer system suitable for implementing the present invention.

With reference to FIG. 7, in one embodiment the foregoing firmware volume access mechanism is implemented as follows. During execution of early firmware 22, one or more firmware volume drivers 76 are loaded from a local firmware device 28 and executed. Execution of each firmware driver causes one or more firmware volume protocol instances 78 to be published, as depicted by FV protocol instances 78A, 78B, 78C, and 78D. Each FV protocol instance provides an abstracted interface that enables consumers of firmware to access that firmware from a corresponding firmware volume. By publishing these abstracted interfaces, the firmware volumes corresponding to those interfaces are made visible to the system.

Figure 8:
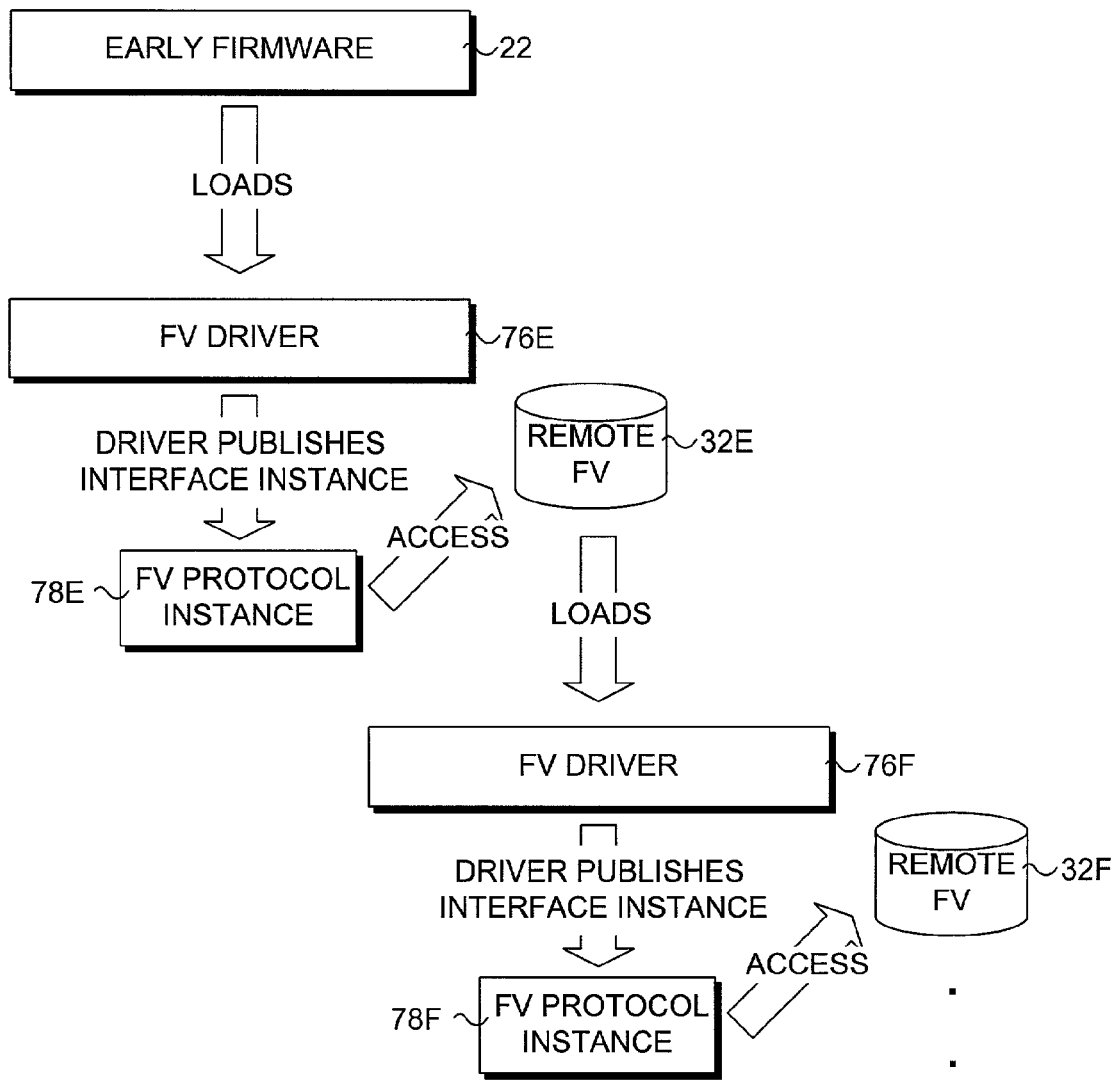
FIG. 8 illustrates that additional firmware drivers can be loaded by firmware that has been previously retrieved from local and/or remote firmware volumes, in accordance with an embodiment of the invention.

As shown in FIG. 8, additional firmware drivers can be loaded by firmware that has been previously retrieved from local and/or remote firmware volumes. These firmware drivers can then publish additional firmware volume protocol instances, which can be used to access additional firmware volumes. For example, during execution of early firmware 22, a firmware volume driver 76E is loaded. Firmware volume driver 76 then publishes a firmware volume protocol instance 78E that enables access to a remote firmware volume 32E. A firmware file is retrieved from remote firmware volume 32E and is loaded and executed, causing a firmware volume driver 76 to be loaded. Firmware volume driver 76 then publishes a firmware volume protocol instance 78F that enables access to a remote firmware volume 32F. This process can be extended in a similar chained manner as many levels as desired.

Exemplary Machine for Implementing the Invention

Figure 9:
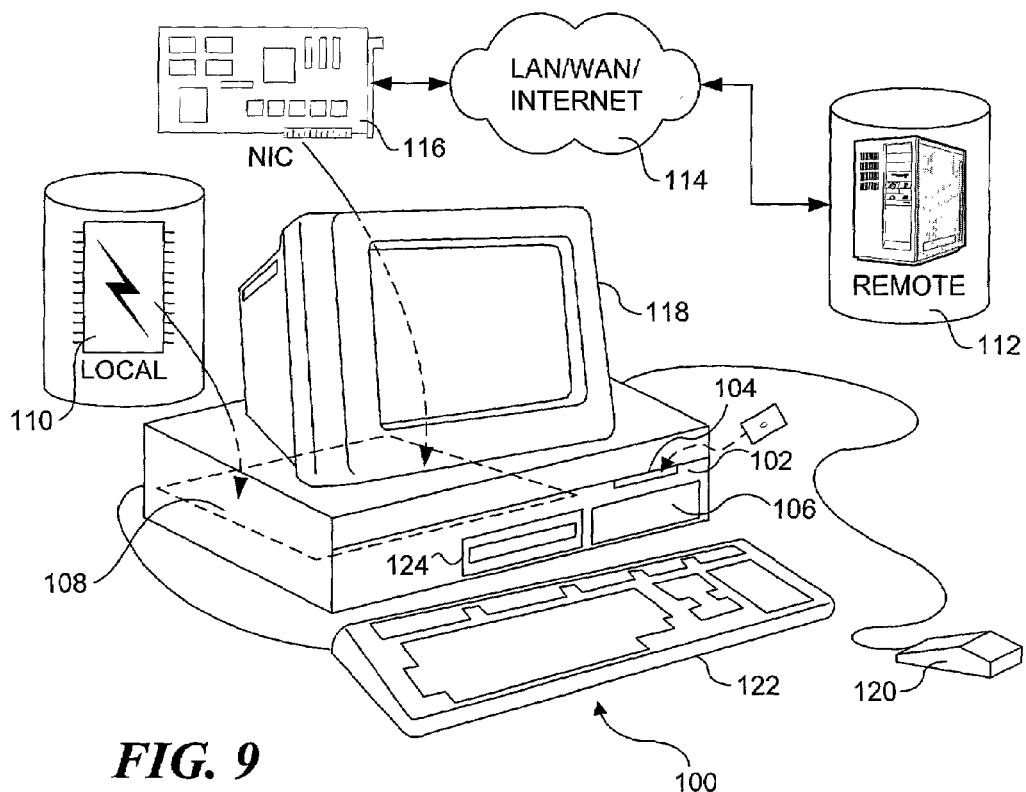
FIG. 9 illustrates a computer system, which is suitable for use in connection with practicing embodiments of the present invention.

With reference to FIG. 9, a generally conventional personal computer 100 is illustrated, which is suitable for use in connection with practicing the present invention. The distributed platform firmware architecture of the invention may also be implemented on workstations, laptops, and computer servers in a similar manner. Personal computer 100 includes a processor chassis 102 in which are mounted a floppy disk drive 104, a hard drive 106, a motherboard 108 populated with appropriate integrated circuits including one or more microprocessors and memory modules (both not shown), and a power supply (also not shown), as are generally well known to those of ordinary skill in the art. Motherboard 108 also includes a local firmware storage device 110 (e.g., flash EPROM) on which the base portion of the BIOS firmware is stored. To facilitate access to the portion of the BIOS firmware that is retrieved from a remote firmware storage device 112 via a network 114, personal computer 100 includes a network interface card 116 or equivalent circuitry built into motherboard 108. Network 114 may comprise a LAN, WAN, and/or the Internet, and may provide a wired or wireless connection between personal computer 100 and remote firmware storage device 112.

A monitor 118 is included for displaying graphics and text generated by software programs that are run by the personal computer and which may generally be displayed during the POST test and other aspect of firmware load/execution. A mouse 120 (or other pointing device) is connected to a serial port (or to a bus port) on the rear of processor chassis 102, and signals from mouse 120 are conveyed to motherboard 108 to control a cursor on the display and to select text, menu options, and graphic components displayed on monitor 118 by software programs executing on the personal computer. In addition, a keyboard 122 is coupled to the motherboard for user entry of text and commands that affect the running of software programs executing on the personal computer.

Personal computer 100 also optionally includes a compact disk-read only memory (CD-ROM) drive 124 into which a CD-ROM disk may be inserted so that executable files and data on the disk can be read for transfer into the memory and/or into storage on hard drive 106 of personal computer 100. If the base BIOS firmware is stored on a rewriteable device, such as a flash EPROM, machine instructions for updating the base portion of the BIOS firmware may be stored on a CD-ROM disk or a floppy disk and read and processed by the computer's processor to rewrite the BIOS firmware stored on the flash EPROM. Updateable BIOS firmware may also be loaded via network 114.

Machines similar to computer 100 may be used for the various servers in the system. However, it is preferable that machines that are designed specifically for web, file and application server functions be implemented as such.

In general, from the viewpoint of hardware and software components running on the computer system, those components will not be able to distinguish that respective portions of the BIOS firmware are stored on local and remote storage devices. Other than the loading and initial execution of the BIOS firmware for testing system integrity and determining/verifying the system configuration and other pre-OS boot processes, a computer system implementing the invention will function in an identical manner to a conventional computer system that uses the same components and runs the same software.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method comprising:
   loading platform firmware during a single pre-boot phase of a computer system by,
   executing a first portion of platform firmware code that is stored locally in the computer system during the single pre-boot phase, wherein execution of the first portion of firmware code loads a first driver that publishes a first firmware volume (FV) interface protocol instance;
   retrieving a first portion of a second portion of platform firmware code from a first firmware volume FV stored on a remote firmware storage device via the first FV interface protocol;
   loading and executing the first portion of the second portion of platform firmware code during the single pre-boot phase, thereby causing a second driver to be loaded that publishes a second FV interface protocol instance that enables access to a second FV;
   retrieving a second portion of the second portion of firmware code from the second FV via the second FV interface protocol instance; and
   executing the second portion of the second portion of platform firmware code during the single pre-boot phase.

2. The method of claim 1, wherein execution of the first portion of platform firmware code performs the functions of:
   initializing a processor chipset and system memory;
   initializing a network interface; and
   establishing a network communication link with a network server via which the remote firmware storage device may be accessed.

3. The method of claim 2, wherein execution of the first portion of platform firmware code further performs the function of requesting the network server to send a particular set of platform firmware code corresponding to the first portion of the second portion of platform firmware code that is stored in the first FV over the network communication link to the computer system.

4. The method of claim 3, further comprising determining a location of the first FV on the remote firmware storage device.

5. The method of claim 4, wherein the location of the first FV is determined by:
   passing platform identification information to the network server; and
   determining the location of the first FV based on the platform identification information passed to the network server.

6. The method of claim 5, wherein the platform identification information comprises one of a processor identification code corresponding to a processor for the computer system or a model number for the computer system.

7. The method of claim 3, further comprising:
   creating configuration information that maps a pointer to an appropriate set of platform firmware code for the computer system with a network identifier for the computer system;
   sending a message to the network server requesting the network server to send back the appropriate set of platform firmware code;
   extracting the network identifier from the message sent to the network server; and
   locating the appropriate set of platform firmware code via the pointer.

8. The method of claim 2, wherein the network server is accessed via an Internet-based network communication link, further comprising:
   storing network location information address corresponding to the network server on a local storage device; and
   using the network location information to access the network server.

9. The method of claim 1, wherein the first FV interface protocol instance comprises a software abstraction that enables consumers of firmware to access the first firmware volume without requiring those consumers to know where or how the firmware code is stored in the first firmware volume.

10. A method comprising:
    loading platform firmware during a single pre-boot phase of a computer system by,
    executing a first portion of platform firmware code that is stored locally in the computer system that loads a first driver that enables access to a first firmware volume (FV) comprising a storage device in which a first portion of a second portion of platform firmware code is stored, wherein the first driver publishes a first FV interface protocol instance for retrieving the first portion of the second portion of platform firmware code;
    retrieving the first portion of the second portion of firmware code from the first firmware volume via the first FV interface protocol instance;
    loading and executing the first portion of the second portion of firmware code during the single pre-boot phase, thereby causing a second driver to be loaded that publishes a second FV interface protocol instance;
    retrieving a second portion of the second portion of platform firmware code from a second firmware volume via the second FV interface protocol instance; and
    executing the second portion of the second portion of platform firmware code during the single pre-boot phase.

11. The method of claim 10, wherein the first FV interface protocol instance comprises a software abstraction that enables consumers of firmware to access the first firmware volume without requiring those consumers to know where or how firmware code is stored in the first firmware volume.

12. A computer system comprising:
    a local storage device in which a first set of platform firmware instructions are stored; and
    a processor coupled to the local storage device,
    wherein execution of the first set of platform firmware instructions by the processor during a single pre-boot phase of the computer system causes the computer system to perform the operations of:
    loading a first driver that publishes a first interface protocol instance for retrieving a second set of platform firmware instructions stored on a remote firmware storage device;
    retrieving the second set of platform firmware instructions from the remote firmware storage device using the first interface protocol instance;
    executing the second set of platform firmware instructions during the single pre-boot phase, thereby causing a second driver to be loaded that publishes a second interface protocol instance for retrieving a third set of platform firmware instructions;

retrieving the third set of platform firmware instructions using the second interface protocol instance; and executing the third set of platform firmware instructions during the single pre-boot phase.

13. The system of claim 12, wherein execution of the first set of platform firmware instructions performs the operations of:

initializing a processor chipset and system memory;

initializing a network interface; and establishing a network communication link with a network server via which the remote firmware storage device may be accessed.

14. The system of claim 12, wherein the second set of platform firmware instructions are stored in a firmware volume (FV).

15. The system of claim 12, wherein the third set of platform firmware instructions are stored in a firmware volume (FV).

16. A non-volatile memory component in which a first portion of platform firmware instructions are stored that when executed by a processor causes a computer system in which the processor is operating to perform the operations of:

loading a first driver that publishes a first interface protocol instance for retrieving a second portion platform firmware instructions stored on a remote firmware storage device;

retrieving the second portion of platform firmware instructions from the remote firmware storage device using the first interface protocol instance;

executing the second portion platform firmware instructions during the single pre-boot phase, thereby causing a second driver to be loaded that publishes a second interface protocol instance for retrieving a third portion of platform firmware instructions;

retrieving the third portion of platform firmware instructions using the second interface protocol instance; and executing the third portion of platform firmware instructions during the single pre-boot phase.

17. The non-volatile memory component of claim 16, wherein the non-volatile memory component comprises a flash ROM component disposed on a motherboard of the computer system.

18. The non-volatile memory component of claim 16, wherein execution of the first portion of platform firmware instructions performs the operations of:

initializing a processor chipset and system memory;

initializing a network interface; and establishing a network communication link with a network firmware server via which the remote firmware storage device may be accessed.

19. The non-volatile memory component of claim 16, wherein the second portion of platform firmware instructions are stored in a firmware volume (FV).

20. The non-volatile memory component of claim 16, wherein the third portion of platform firmware instructions are stored in a firmware volume (FV).

* * * * *